(12) United States Patent
Lee et al.

(10) Patent No.: US 6,935,816 B2
(45) Date of Patent: Aug. 30, 2005

(54) HIGH STIFFNESS COMPOSITION TOOL BAR

(75) Inventors: Dai Gil Lee, Daejeon (KR); Jin-Kook Kim, Daejeon (KR); Hui-Yun Hwang, Daejeon (KR); Young-So Yoon, Seoul (KR); Sang-Kon Kim, Seoul (KR)

(73) Assignee: Korea Advanced Institute of Science and Technology, Daejon (KR)

( * ) Notice: Subject to any disclaimer, the term of this patent is extended or adjusted under 35 U.S.C. 154(b) by 19 days.

(21) Appl. No.: 10/764,240

(22) Filed: Jan. 23, 2004

(65) Prior Publication Data

US 2004/0191019 A1 Sep. 30, 2004

Related U.S. Application Data

(63) Continuation of application No. PCT/KR02/01379, filed on Jul. 23, 2002.

(30) Foreign Application Priority Data

Jul. 23, 2001 (KR) .............................. 10-2001-0044095
Jul. 9, 2002 (KR) .............................. 10-2002-0039629

(51) Int. Cl.$^7$ .............................................. B23B 29/02
(52) U.S. Cl. ...................... 408/144; 408/226; 408/238; 408/705; 82/158
(58) Field of Search .............................. 408/143, 144, 408/223, 224, 226, 227, 238, 705, 708; 407/119; 82/158

(56) References Cited

U.S. PATENT DOCUMENTS

| | | | | |
|---|---|---|---|---|
| 3,820,422 A | * | 6/1974 | Rivin et al. ................... 82/158 |
| 3,865,502 A | * | 2/1975 | Hamann ...................... 408/226 |
| 4,072,084 A | * | 2/1978 | Knight et al. ................ 409/234 |
| 4,160,616 A | * | 7/1979 | Winblad ...................... 408/144 |
| 4,979,851 A | * | 12/1990 | Hunt ............................ 408/143 |
| 4,998,851 A | * | 3/1991 | Hunt ............................ 408/143 |
| 5,018,915 A | * | 5/1991 | Inokuma et al. ............. 409/231 |

FOREIGN PATENT DOCUMENTS

| | | | | |
|---|---|---|---|---|
| EP | 391881 A2 | * | 10/1990 | ........... B23B/29/02 |
| EP | 812641 A1 | * | 12/1997 | ........... B23B/29/02 |
| JP | 58-102604 | * | 6/1983 | ........... B23B/27/00 |
| JP | 60-238202 | * | 11/1985 | ........... B23B/29/03 |
| JP | 7-290305 A | * | 11/1995 | ........... B23B/29/02 |
| JP | 8-174313 | * | 7/1996 | ........... B23B/29/02 |
| JP | 8-229711 | * | 9/1996 | ........... B23B/29/02 |
| JP | 9-277106 | * | 10/1997 | ........... B23B/29/02 |
| JP | 2003-145322 | * | 5/2003 | ........... B23B/29/02 |
| WO | PCT/KR02/01379 | | 11/2003 | |

OTHER PUBLICATIONS

Incomplete copy of USSR 1761386, published Sep. 15, 1992. Complete copy is unavailable.*

* cited by examiner

Primary Examiner—Daniel W. Howell
(74) Attorney, Agent, or Firm—Graybeal Jackson Haley LLP

(57) ABSTRACT

The present invention is to provide a machining tool bar in which mechanical machining properties are improved by using high stiffness composite material.

According to the present invention, the tool bar includes an adaptor constructed to be coupled to a driving device, a body constructed to be mounted with cutting tools and a tip constructed to be supported by a workpiece, said body is constructed to be mounted with one or more cutting tools, wherein the adaptor and tip are made of metal material, the body is made of composite material having high stiffness, the composite material constructing the body is formed to surround at least a portion of the adaptor and at least a portion of the tip, and the metal material constructing the adaptor and tip and the composite material constructing the body are securely joined to each other in an interface therebetween.

26 Claims, 8 Drawing Sheets

HIGH STIFFNESS COMPOSITION TOOL BAR

Priority claim

This application is a continuation of the PCT Application No. PCT/KR02/01379, filed 23 Jul. 2002, which is herein incorporated by reference, that claims priority from two Korean Patent Applications No. 2001/44095 filed 23 Jul. 2001 and No. 2002/39629 filed 9 Jul. 2002, each herein incorporated by reference. This application claims the benefit of the filing date of the PCT Application under 35 USC §120. This application also claims priority from the two Korean Patent Applications No. 2001/44095 and No. 2002/39629, each of which is herein incorporated by reference.

TECHNICAL FIELD

The present invention relates to a machining tool bar such as a boring bar or a reaming bar for expanding and finishing a machined hole, and more particularly, to a high stiffness composite tool bar which is made of metal material having high stiffness and composite material having high specific stiffness and high damping capacity so that a bending phenomenon due to vibration is prevented, chattering is prevented from being generated on a surface to be machined, and mechanical machining properties are enhanced, upon performing cutting operations.

BACKGROUND ART

Tool bars for use in mounting cutting tools such as most of conventional boring and reaming bars are manufactured to be elongated and thin in order to machine a deep hole. Since this configuration leads to low bending strength and stiffness, a bending phenomenon is generated, a machining accuracy is lowered and chattering is produced on a surface to be machined due to its low natural frequency, upon performing cutting operations. Accordingly, upper thresholds of a cutting speed and a feed rate are low, and it is impossible to machine a deep hole. Therefore, in order to overcome such disadvantages, various shapes of cutting tools and tool bars for use in mounting the cutting tools have been developed, and many other tool bars for use in mounting cutting tools, which are made of tungsten carbide alloy and tool steel having very excellent stiffness and rigidity characteristics, have been also developed in advanced countries. However, since it is difficult to machine cemented carbide, there is a disadvantage in that manufacturing costs of a tool bar exhibiting optimum performance become very high. Further, since the natural frequency of a boring bar or a reaming bar is low due to high densities of tungsten carbide and tool steel, there is a limitation on improvement of the cutting speed of the bar.

DISCLOSURE OF INVENTION

Therefore, an object of the present invention is to provide a high stiffness composite tool bar using high stiffness composite material capable of substituting for a conventional boring and reaming bars which have been made of tungsten carbide alloy and tool steel.

According to the present invention for achieving the above object, there is provided a tool bar including an adaptor constructed to be coupled to a driving device, a body constructed to be mounted with cutting tools and a tip constructed to be supported by a workpiece, said body being constructed to be mounted with one or more cutting tools, wherein the adaptor and tip are made of metal material, the body is made of composite material having high stiffness, the composite material constructing the body is formed to surround at least a portion of the adaptor and at least a portion of the tip, and the metal material constructing the adaptor and tip and the composite material constructing the body are securely joined to each other in an interface therebetween.

Further, according to the present invention, there is provided a tool bar mounted with cutting tools for machining a workpiece comprising a metal bar occupying a portion of the length of the tool bar, a composite bar occupying the remainder of the length of the bar, and a connecting member which surrounds the circumference of the metal bar and composite bar and fixes the metal bar and the composite bar to each other.

BEST MODE FOR CARRYING OUT THE INVENTION

Objects, features and advantages of the present invention will be more apparent when reading descriptions of the following preferred embodiments of the present invention given with reference to the accompanying drawings.

FIGS. 1 to 4 show a tool bar according to a first embodiment of the present invention.

Figure 1:
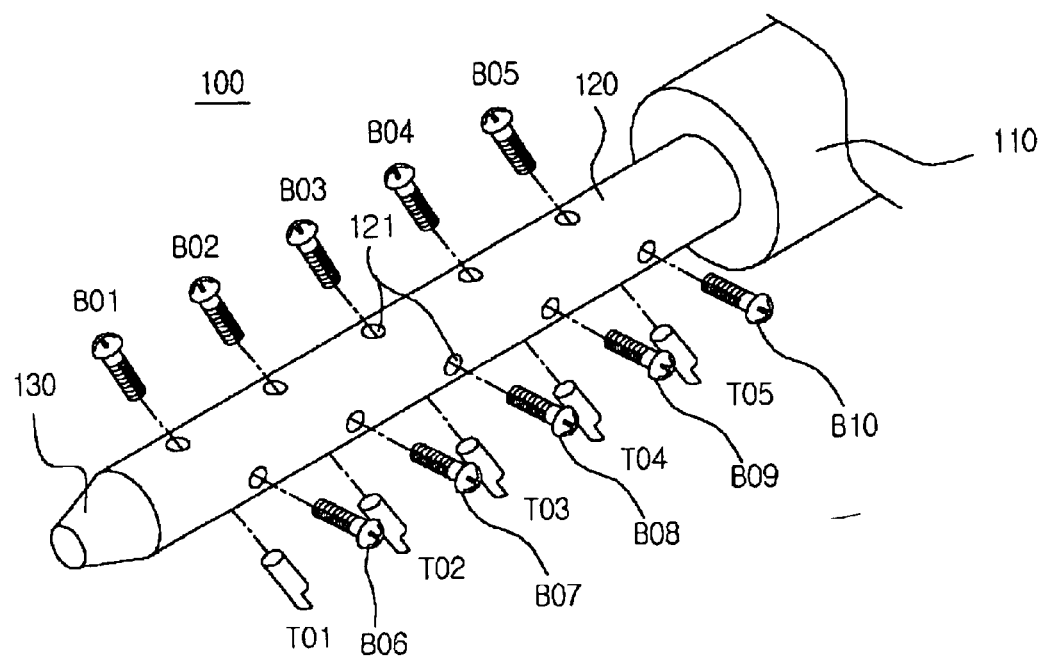
FIG. 1 is a perspective view showing a portion of a tool bar according to a first embodiment of the present invention.

As shown in FIG. 1, a tool bar 100 is functionally divided into an adaptor 110 constructed to be coupled to a driving device, a body 120 constructed to be mounted with cutting tools, and a tip 130 constructed to be supported by a workpiece. The body 120 can be mounted with a plurality of cutting tools. Here, there is exemplified the tool bar 100, which can be mounted with five cutting tools T01 to T05 along a longitudinal axis of the body 120.

The adaptor 110 and tip 130 of the tool bar 100 according to this embodiment are made of tool steel, and the body 120 is made of carbon fiber composite material having high stiffness. However, the material of the adaptor 110 and tip 130 of the tool bar is not limited to the tool steel, and any metal material can be used as long as it has proper stiffness and rigidity. Further, the material of the body 120 is not limited to the carbon fiber composite material having high stiffness, and any composite material may be used as long as it has similar properties, including stiffness, rigidity and density in a cured state.

Figure 2:
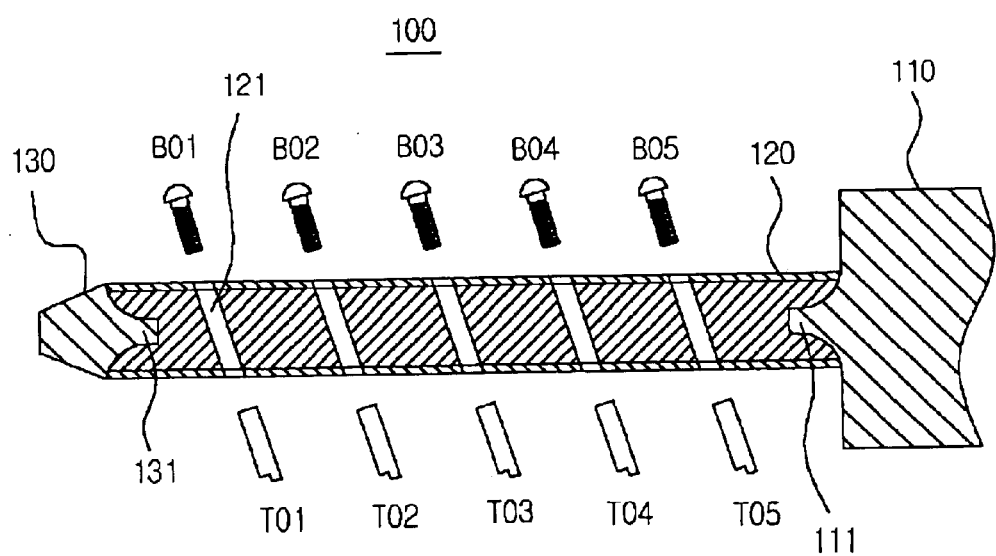
FIG. 2 is a longitudinal sectional view of the tool bar shown in FIG. 1.

As shown in FIG. 2, the adaptor 110 and tip 130 are formed with engagement protrusions 111, 131, respectively. The engagement protrusion 111 of the adaptor 110 is inserted into the body 120 at an end of the body 120 and is securely joined with composite material for constructing the body 120. The engagement protrusion 131 of the tip 130 is inserted into the body 120 at the other end of the body 120 and is securely joined with composite material for constructing the body 120.

Figure 3:
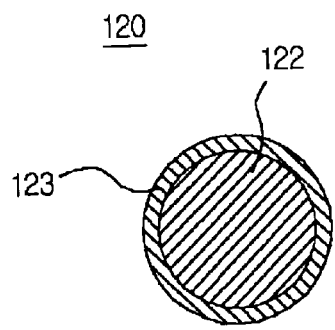
FIG. 3 is a cross sectional view of a body of the tool bar shown in FIG. 1.

As shown in FIG. 3, the interior 122 of the body 120 is formed of the composite material, and a hardness reinforcement coating layer 123 of Cr or Ni based alloy is coated on a surface of the body. Such a coating layer 123 serves to reinforce the hardness of the surface of the composite material, and also prevent moisture from being infiltrated into the composite material.

Figure 4:
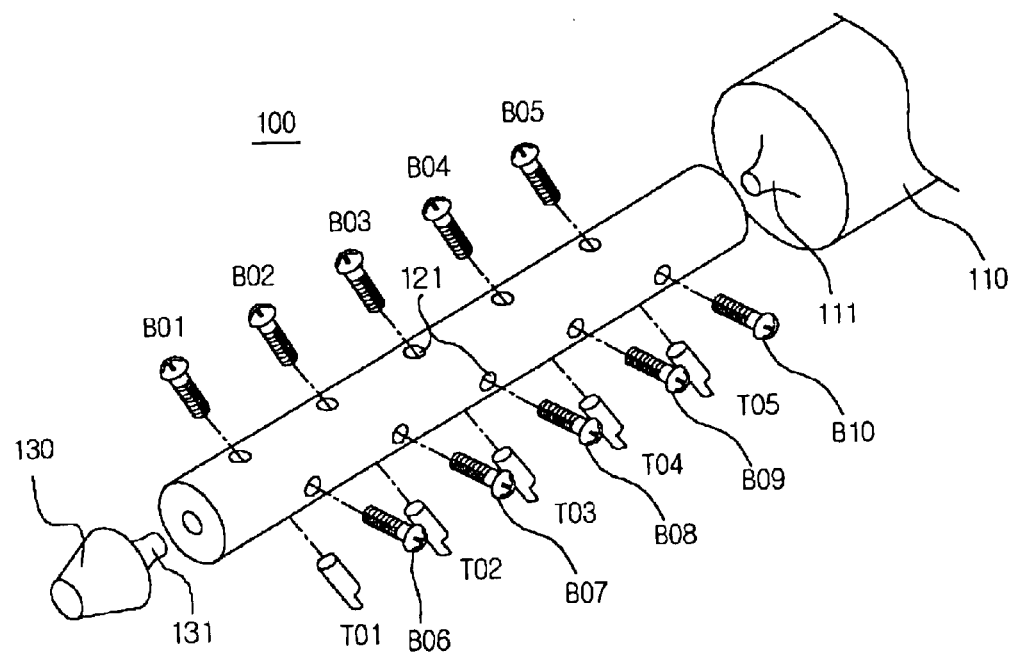
FIG. 4 is an exploded perspective view of the tool bar shown in FIG. 1.

The body 120 is perforated with ten holes 121 for use in mounting the aforementioned ten cutting tools. The cutting tools T01 to T05 may be mounted in the body, for example, by inserting trailing ends of the cutting tools into the corresponding holes through one side inlets of the holes, inserting bolts B01 to B05 into the holes through the other side inlets of the holes, and then screwing the bolts into nuts formed in the trailing ends of the cutting tools. In FIGS. 1 and 4, in addition to the bolts B01 to B05 disposed in a first row for tightening the trailing ends of the cutting tools T01 to T05, the cutting tools are further tightened by bolts B06 to B10 disposed in a second row having a phase difference of 90° with respect to the first row. Thus, if the cutting tools are tightened by the bolts in the two directions, the cutting tools T01 to T05 can be mounted in the holes without any play even if differences between the diameters of the cutting tools T01 to T05 and the diameters of the holes 120 are large. Besides the above method, various mounting methods may be used. However, since such mounting methods are not a problem to be solved by the present invention, they will not be in detail described herein.

In manufacturing the tool bar 100 according to this embodiment, the adaptor 110 and tip 130 formed with the engagement protrusions 111, 131 are first spaced apart from each other by a distance corresponding to the total length of the body 120 so that the engagement protrusions 111, 131 are disposed to face to each other, and the body 120 surrounding the engagement protrusions 111, 131 at both sides thereof is formed to have a proper thickness by using non-cured composite material. The composite material is securely joined with surfaces of the engagement protrusions 111, 131 during a curing process. However, if the surfaces of the engagement protrusions 111, 131 are roughly formed or an adhesion improver or the like which can increase joining force with the composite material is applied to the surfaces, the joining force between them can be reinforced.

As to a method of forming the body 120, a method of winding a composite material sheet in a roll form is mainly used. As to a method of curing the wound composite material sheet, a vacuum bag forming method is mainly used. Since these forming methods have been already widely known in a method of forming a structural frame using composite material, the detailed description thereof will be omitted herein.

Subsequently, the cured body 120 is ground to be thinner than the tip 130, five holes 121 disposed in the first row and five holes disposed in the second row having the phase difference of 90° with respect to the first row are perforated in the body, and tapping for bolt fastening is performed, if necessary. The tool bar 100 is completed by coating the surface of the body 120 which has been ground to be thinner than the tip 130 with Cr or Ni based alloy and then finishing the coated body 120 so that the coated body has the same diameter as the tip 130.

Figure 5:
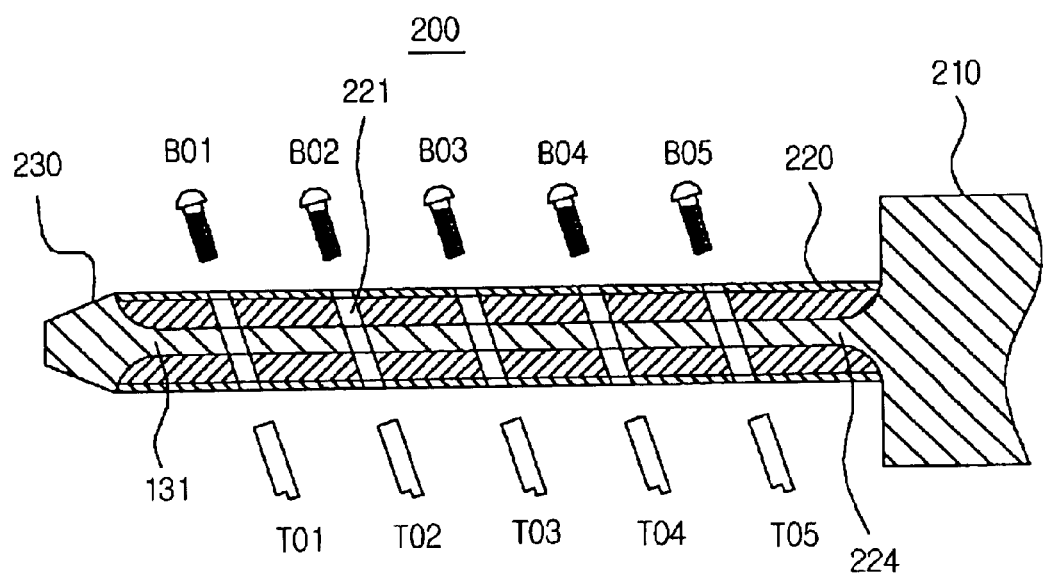
FIG. 5 is a perspective view showing a portion of a tool bar according to a second embodiment of the present invention.
Figure 6:
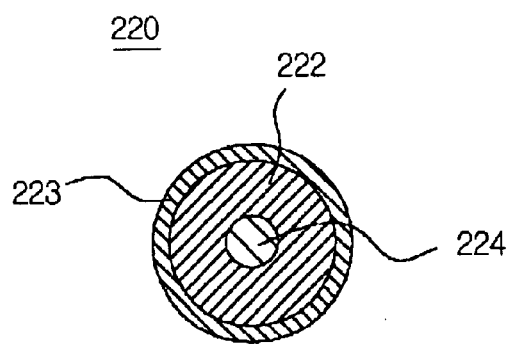
FIG. 6 is a cross sectional view of a body of the tool bar shown in FIG. 5.

FIGS. 5 and 6 show a tool bar 200 according to a second embodiment of the present invention. The tool bar 200 according to this embodiment has the same constitution as the tool bar 100 according to the first embodiment except that an adaptor 210 and a tip 230 are formed to be integrally connected to each other via a rod 224 made of tool steel, which is the same material as the adaptor 210 and tip 230. In FIGS. 5 and 6, components designated by reference numerals of which the last two digits are identical to those in FIGS. 1 to 4 are the same components as the tool bar 100 according to the first embodiment. Hereinafter, the descriptions of the components which are the same components as the tool bar 100 according to the first embodiment will be omitted. In the body 220 of the tool bar 200 according to this embodiment, the tool steel rod 244 is disposed in the center of the body, a composite material layer 222 is laminated on the tool steel rod 224, and a Cr or Ni based alloy coating layer 223 is laminated on the composite material layer 222, as shown in FIG. 6.

In manufacturing the tool bar 200 according to this embodiment, this manufacturing method is similar to the method of manufacturing the tool bar 100 according to the first embodiment, except that the adaptor 210 and tip 230 which are connected via and integrally formed with the tool steel rod 224 are prepared instead of preparing the adaptor 110 and tip 130 formed with the engagement protrusions 111, 131.

Figure 7:
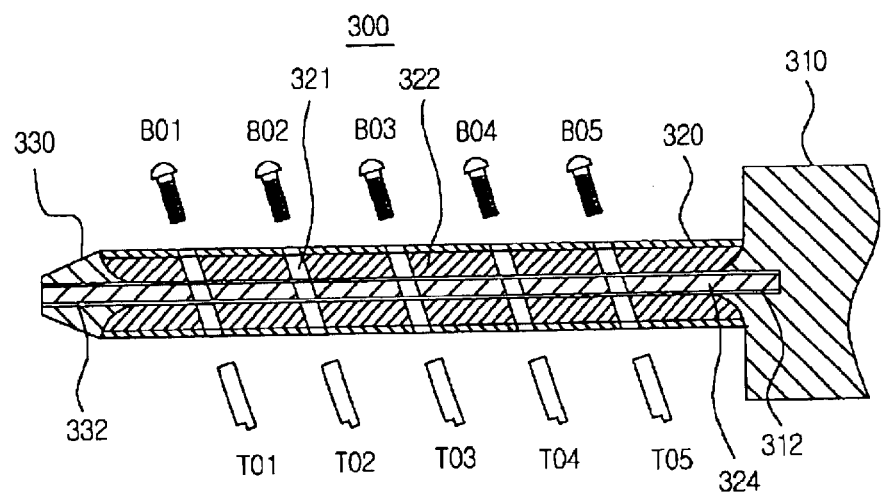
FIG. 7 is a perspective view showing a portion of a tool bar according to a third embodiment of the present invention.
Figure 8:
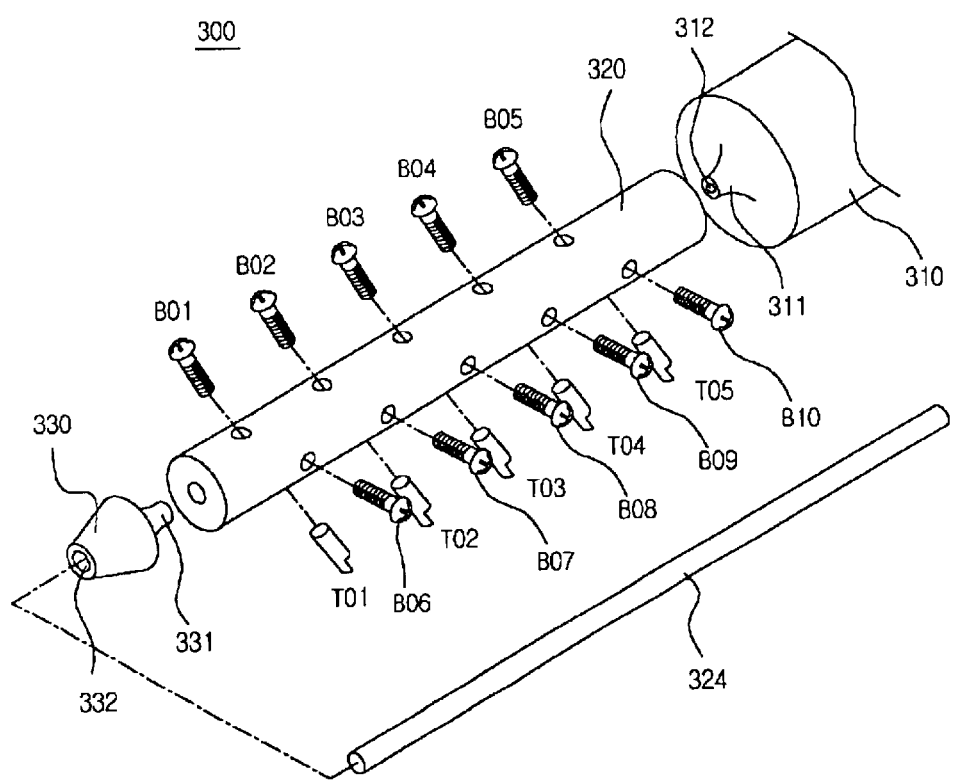
FIG. 8 is an exploded perspective view of the tool bar shown in FIG. 7.
Figure 9:
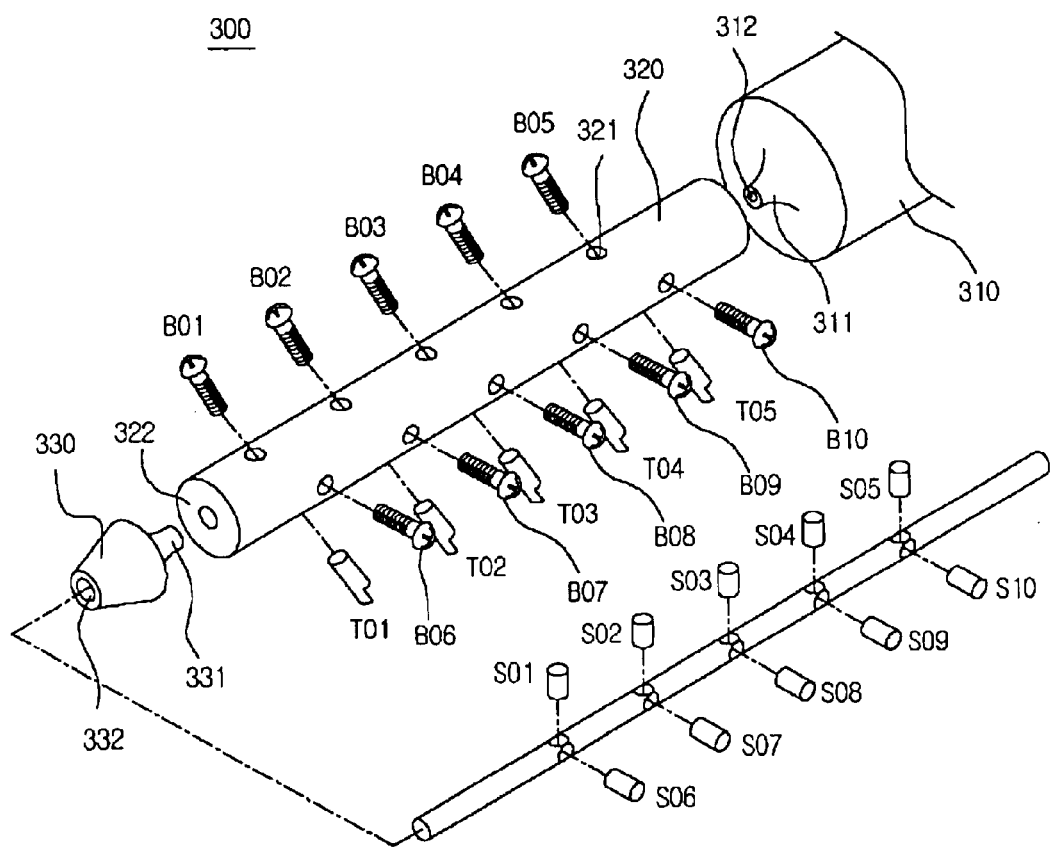
FIG. 9 is a view similar to FIG. 8, in which a shim for use in a manufacturing process is shown together with the tool bar.

FIGS. 7 to 9 show a tool bar 300 according to a third embodiment of the present invention. The tool bar 300 according to this embodiment has the same constitution as the tool bar 200 according to the second embodiment except that a tool steel rod 324 is not integrally formed with an adaptor 310 and a tip 330, and the rod 324, the adaptor 310 and the tip 330 are formed as separate members and engaged in an interference-fit manner. In FIGS. 7 to 9, components designated by reference numerals of which the last two digits are identical to those in FIGS. 5 and 6 are the same components as the tool bar 200 according to the second embodiment. Hereinafter, the descriptions of the components which are the same components as the tool bar 200 according to the second embodiment will be omitted.

In manufacturing the tool bar 300 according to this embodiment, this manufacturing method is similar to the method of manufacturing the tool bar 200 according to the second embodiment, except that the separately formed rod 324, and the adaptor 210 and tip 230 which are separately formed in a state where holes 312, 332 for receiving the rod 324 therein are perforated are prepared and the rod 324 is interference fitted into and engaged with the holes 312, 332, instead of preparing the adaptor 310 and tip 330 which are connected via and integrally formed with the rod 224.

As to a further method of manufacturing the tool bar 300 according to this embodiment, as shown in FIG. 9, before a composite material layer 322 is laminated on an outer surface of the rod 324, holes are beforehand perforated in the rod 324 at positions corresponding to holes 321 for use in mounting the aforementioned cutting tools, and for example, steel shims S01 to S10 are fitted into the holes. These shims S01 to S10 are pulled out after the composite layer 322 has been laminated and cured, and the cutting tool mounting holes are thus formed without any separate perforating operations. This method may be equally used for the aforementioned method of manufacturing the tool bar 200 according to the second embodiment.

Figure 10:
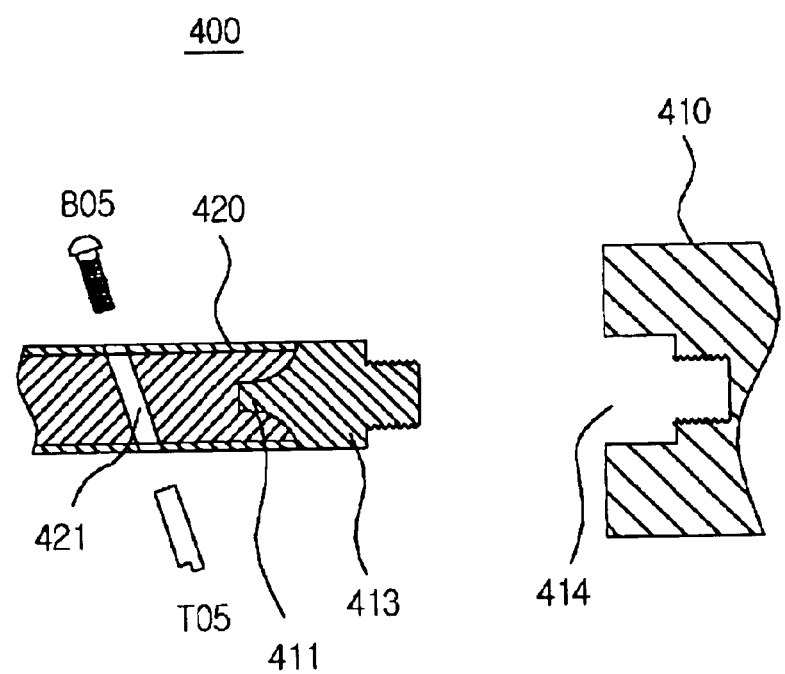
FIG. 10 is a perspective view showing a portion of a tool bar according to a fourth embodiment of the present invention.

FIG. 10 shows a tool bar 400 according to a fourth embodiment of the present invention. The tool bar 400 according to this embodiment has the same constitution as the tool bar 100 according to the first embodiment except that an adaptor 410 is not an integral member but formed as two members including a shank 413 which is separated from a body of the adaptor 410. In FIG. 10, components designated by reference numerals of which the last two digits are identical to those in FIGS. 1 to 4 are the same components as the tool bar 100 according to the first embodiment. Hereinafter, the descriptions of the components which are the same components as the tool bar 100 according to the first embodiment will be omitted. The body of the adaptor 410 of the tool bar 400 according to this embodiment is formed with a hole 414 into which the shank 413 can be inserted. The diameter of the shank 413 is preferably formed to have the same diameter as a body 420. As to a method of engaging the shank 413 with the hole 414, a method of machining a nut in the hole 414, machining a bolt on the shank 413 and then thread-engaging or interference-fitting them may be used.

In manufacturing the tool bar 400 according to this embodiment, this manufacturing method is similar to the method of manufacturing the tool bar 100 according to the first embodiment, except that the shank 413 is engaged with the hole 414 of the body of the adaptor 410 after the body 420 has been completely formed. Since the shank 413 has the same diameter as the body 420, it can be much easily formed as compared with formation of the whole including the body of the adaptor 410 having a different diameter in a vacuum bag.

Meanwhile, high stiffness composite tool bars according to fifth and sixth embodiments will be in detail described below.

Figure 11:
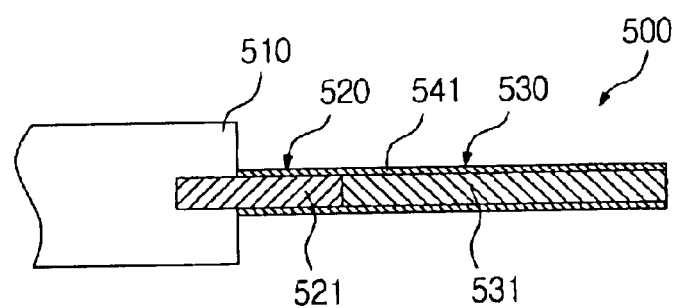
FIG. 11 is a sectional view of a machining tool bar having a stiffness gradient according to a fifth embodiment of the present invention.
Figure 12:
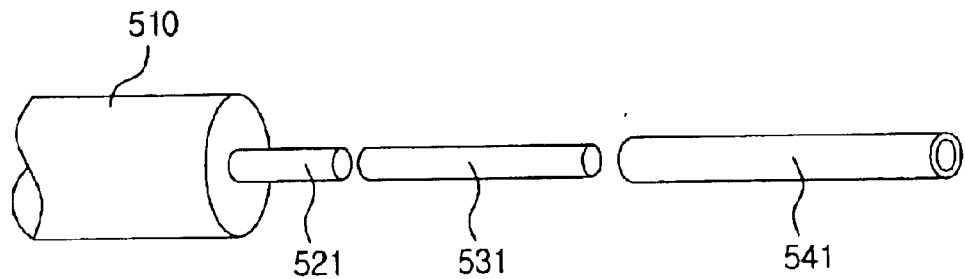
FIG. 12 is a schematic view showing an assembly relationship between components of the machining tool bar shown in FIG. 11.

In the drawings, FIG. 11 is a sectional view of the machining tool bar having a stiffness gradient according to the fifth embodiment of the present invention, and FIG. 12 is a schematic view showing an assembly relationship between components of the machining tool bar shown in FIG. 11.

As shown in FIGS. 11 and 12, the tool bar 500 having the stiffness gradient comprises a metal material portion 520 having high static stiffness and serving as a portion which is fastened to a tool mounting portion 510 and a composite material portion 530 in which cutting tools are mounted and which corresponds to a free end of the tool bar 500 and has high specific stiffness.

The metal material portion 520 includes a cylindrical metal bar 521 made of high static stiffness material such as tungsten carbide alloy. An end of the metal bar 521 is fastened and fixed to the tool mounting portion 510, and the composite material portion 530 is fixed to and positioned at the other end of the metal bar 521.

The composite material portion 530 includes a cylindrical composite bar 531 made of composite material having high specific stiffness. An end of the composite bar 531 is positioned at a position corresponding to the other end of the metal bar 521, and the composite bar 531 and metal bar 521 are attached and fixed to each other by using an adhesive.

In this state, a connecting member 541 is positioned to surround the circumference of the composite bar 531 and metal bar 521. The adhesive is applied between the bars and the connecting member 541 surrounding the metal bar 521 and composite bar 531 so that the connecting member 541 and the two bars 521, 531 are fixedly bonded to each other.

Meanwhile, by completely curing the incomplete tool bar manufactured as such by the vacuum bag forming method, the tool bar is completed. The tool bar completed as such is mounted in the tool mounting portion 510. The metal material portion 520 of the tool bar 500 is mounted in and fixed to the tool mounting portion 510, and the composite material portion 530 is formed with fastening holes by drilling or cutting so that the cutting tools can be fastened to the tool bar 500.

Thus, in the tool bar 500 comprising the metal material portion 520 and the composite material portion 530, since the cutting or drilling in the composite material portion 530 has been already described in the aforementioned embodiments, the detailed description of machining of the composite material portion 530 for allowing the cutting tools to be fastened to the tool bar 500 will be omitted.

Hereinafter, the sixth embodiment of the present invention will be in detail described.

When the tool bar of the sixth embodiment is compared with the tool bar of the fifth embodiment, although the tool bar of the fifth embodiment comprises one metal material portion and one composite material portion, components of the tool bar of the sixth embodiment are identical or similar to those of the fifth embodiment except that there are a plurality of metal material portions and composite material portions. Therefore, in the sixth embodiment, the detailed description of components identical or similar to those of the fifth embodiment will be omitted.

Figure 13:
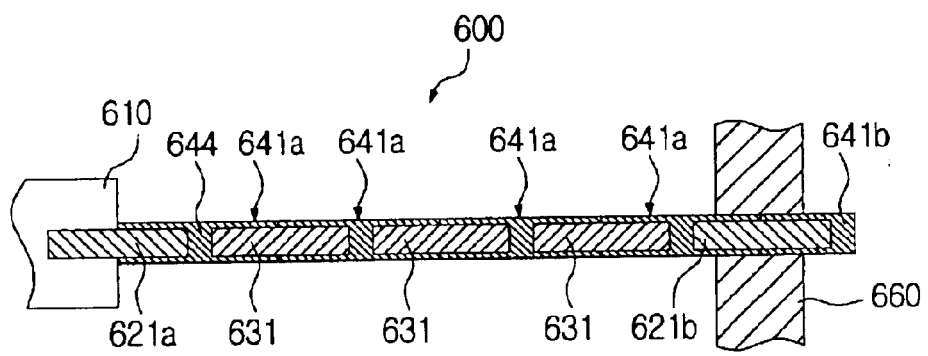
FIG. 13 is a sectional view showing a machining tool bar having a stiffness gradient according to a sixth embodiment of the present invention.
Figure 14:
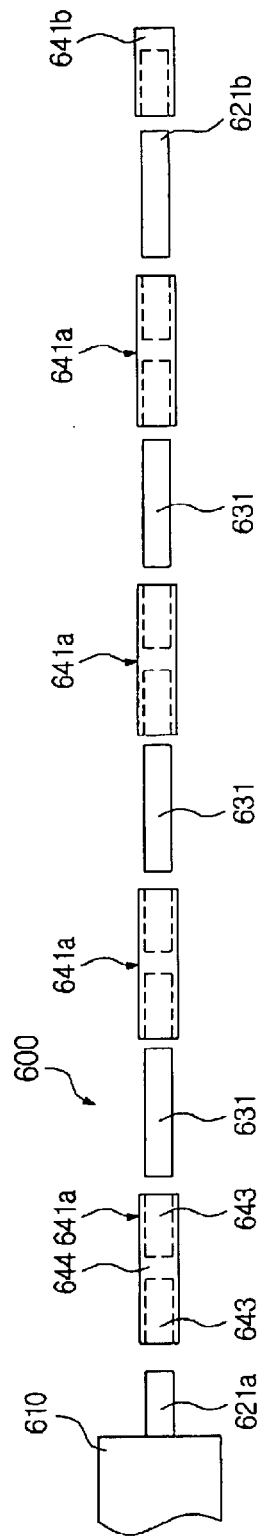
FIG. 14 is a schematic view showing an assembly relationship between components of the machining tool bar shown in FIG. 13.
Figure 15:
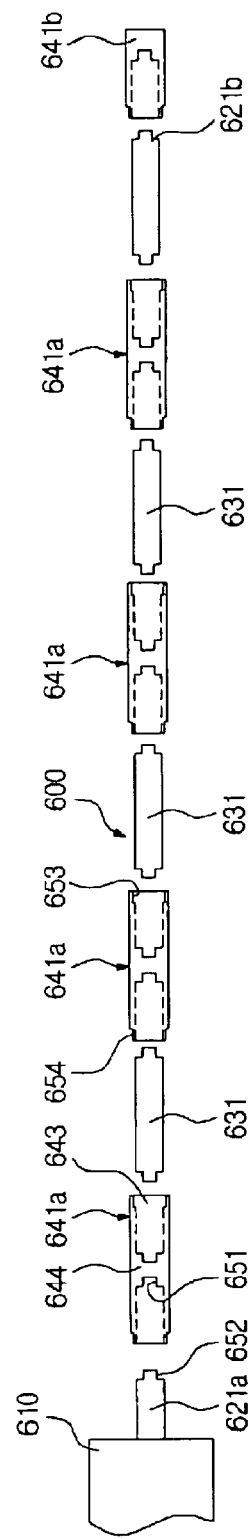
FIG. 15 is a schematic view of metal bars, composite bars and connecting members, in which step portions are formed to ensure effective engagement of the metal bars, the composite bars and the connecting members with one another, in the machining tool bar shown in FIG. 13.

In the drawings, FIG. 13 is a sectional view of a machining tool bar having a stiffness gradient according to the sixth embodiment of the present invention, and FIG. 14 is a schematic view showing an assembly relationship between components of the machining tool bar shown in FIG. 13. FIG. 15 is a schematic view of metal bars, composite bars and connecting members, in which step portions are formed to ensure effective engagement of the metal bars, the composite bars and the connecting members with one another, in the machining tool bar shown in FIG. 13.

As shown in FIGS. 13 and 14, a tool bar 600 having a stiffness gradient is relatively longer than the tool bar 500 of the fifth embodiment.

Cylindrical metal bars 621a, 621b made of high static stiffness material such as tungsten carbide alloy are placed at one end of the tool bar 600 engaged with a tool bar mounting portion 610 and at a middle portion of the tool bar 600 in a longitudinal direction of the tool bar 600, respectively. Further, a plurality of composite bars 631 having high specific stiffness are placed between the metal bar 621*a* engaged with the tool bar mounting portion 610 and the other metal bar 621*b*.

Meanwhile, connecting members 641*a* made of general metals such as steel are placed between such bars 621*a*, 621*b* and 631, respectively, to connect the two adjacent bars 621*a*, 621*b* and 631 positioned on both sides of each of the connecting members. Each of the connecting bars 641*a* takes a cylindrical bar and has circular recesses 643 longitudinally formed at central portions of both end surfaces of the connecting bar. Each of the circular recesses 643 is formed to have a depth corresponding to a half of the length of the metal bars 621*a*, 621*b* and the composite bars 631, which have an identical length. An inner diameter of each of the circular recesses is identical with the diameter of the metal bars 621*a*, 621*b* and composite bars 631. Therefore, when one end of any one of the metal bars 621*a*, 621*b* and composite bars 631 is fitted into the circular recess 643 of any one of the connecting members 641*a*, and the other end thereof is fitted into the circular recess 643 of the other connecting member 641*a*, the metal bar 621*a* or 621*b*, or composite bar 631 is placed within the two connecting members 641*a* not to be exposed to the outside.

At this time, each of the connecting members 641*a* is longer than the metal bars 621*a*, 621*b* and composite bars 631. Thus, there is no space of the circular recess 643 within the connecting member 641*a* in the longitudinal middle 644 of the connecting member 641*a*.

In the meantime, as shown in FIGS. 13 and 14, the last connecting member 641*b* placed at a free end of the tool bar 600 is formed to be shorter than the other connecting members 641*a*. The last connecting member 641*b* is formed with only one circular recess 643 into which the metal bar 621*b* is fitted, so as not to have any other circular recess.

In the connection relationship among the metal bars 621*a*, 621*b*, the composite bars 631 and the connecting members 641*a*, 641*b*, an adhesive is applied to engagement surfaces of them so that the metal bars 621*a*, 621*b*, the composite bars 631 and the connecting members 641*a*, 641*b* are fixedly attached to one another by the adhesive.

Meanwhile, more preferably, step portions 652 are formed by cutting a circumferential portion of both end surfaces of each of the metal bars 621*a*, 621*b* and composite bars 631 by a predetermined depth, as shown in FIG. 15. Further, a step protrusion 651 which corresponds to the step portion 652, i.e. comes into contact with a step surface of the step portion 652, is formed at an inner bottom side surface of the circular recess 643 of each of the connecting members 641*a*, 642*b*.

Therefore, when the ends of the metal bars 621*a*, 621*b* and composite bars 631 are fitted into the circular recesses 643 of the connecting members 641*a*, 641*b*, the step portions 652 are bonded to the step protrusions 651. The reason to form the step portions 652 and the step protrusions 651 is that when the metal bars 621*a*, 621*b* and composite bars 631 are fitted into the connecting members 641*a*, 641*b*, axial alignment of the bars 621*a*, 621*b* and 631 and the connecting members 641*a*, 641*b* is caused to be ensured and fracture of the connecting members 641*a*, 641*b* due to stress concentration is caused to be prevented if the connecting members are thin in thickness. More preferably, the step portions 652 and step protrusions 651 are tapered to ensure smooth engagement and axial alignment of them.

Moreover, step portions 653, 654 are formed at both ends of each of the connecting members 641*a*, 641*b*. One end of each of the connecting members is formed with the step portion 653 along an inner periphery of the circular recess 643, and the other end of each of the connecting members is formed with the step portion 654 along an outer periphery of each of the connecting members 641*a*, 641*b*. When the plurality of connecting members 641*a*, 641*b* are axially aligned with one another, the step portion 654 formed at the other end of any one of the connecting members 641*a* is fitted into and matched with the step portion 653 formed at the one end of another connecting member 641*b*. Such step portions 653, 654 of the connecting members 641*a*, 641*b* enlarge bonding areas and thus ensure reliable bond.

In a state where the metal bars 621*a*, 62 1*b*, the composite bars 631 and the connecting members 641*a*, 641*b* are fixedly connected to one another in such a way, a fastening hole to which a cutting tool is fastened is formed in the longitudinal middle of each of the connecting members 641*a*. The middle of the connecting portion 641*a* is drilled or cut to form such a fastening hole. Here, the middle of each of the connecting portions 641*a*, 641*b* corresponds to between the circular recesses 643 placed on both sides. Even though the middle 644 of the connecting member 641*a* is drilled or cut, the drilled or cut position is not a position where the composite bar 631 is placed, and thus, breakage of the composite bar 631 is prevented. Further, since the cutting tool is installed in the connecting member 641 made of general metals such as steel, it can be stably fixed thereto.

In the meantime, the tool bar of the sixth embodiment has been described as being constructed by fixedly bonding the metal bars 621*a*, 621*b*, the composite bars 631 and the connecting members 641*a*, 641*b* to one another using the adhesive. However, in the fixing relationship among the metal bars 621*a*, 621*b*, the composite bars 631 and the connecting members 641*a*, 641*b*, the metal bars and the composite bars may be fixed to one another in the interference-fit manner in which the connecting members 641*a*, 641*b* are heated to thermally expand the circular recesses and the metal bars 621*a*, 621*b* and the composite bars 631 are fitted into the circular recesses and then cooled. This can also sufficiently achieve the object and effects of the present invention.

Meanwhile, as shown in FIG. 13, chattering may be produced in the tool bar 600 having a relatively long length as compared with the diameter thereof. In order to prevent such chattering, a support 660 can be installed in the middle of the tool bar 600. More preferably, the metal bars 621*a*, 621*b* of the tool bar 600 are placed at the one end of the tool bar fitted into the tool mounting portion 610 and in the middle of the tool bar corresponding to the support 660, respectively. Such a support 660 is a general bush or bearing. The tool bar 600 penetrates through a hollow portion of the bush in the case of bush, whereas the tool bar 600 is fixed to an inner race of the bearing in the case of bearing.

According to the present invention, the body of the tool bar is manufactured using composite material contrary to the conventional one which has been made of tungsten carbide alloy and tool steel, and the adaptor and the tip are made of the tool steel. Thus, the tool bar of the present invention has stiffness, a natural frequency and a damping ratio higher than those of the conventional tool bar, whereby a cutting speed is increased and a machining accuracy is enhanced upon machining. Consequently, it can contribute to development of the mechanical industry.

Moreover, since the tool bar having the stiffness gradient comprises the metal material having high static stiffness and the composite material having high specific stiffness, the natural frequency and the damping capacity are increased. Thus, upon machining, the cutting stability is improved, the cutting speed is increased and the machining accuracy is then improved. Accordingly, it is possible to form a deep hole.

Generally, the carbon fiber composite material is a material having high specific stiffness and rigidity and a high damping capacity. Since the densities of the tungsten carbide and the tool steel are about ten times and five times as large as that of the carbon fiber composite material, respectively, the natural frequency of the machining tool bar made of the carbon fiber composite material having the same tensile stiffness is about 2.2 to 3.2 times as large as that of the tool bar made of tungsten carbide or tool steel. Further, since the damping capacity is increased, vibration generated upon cutting is reduced as compared with that of the conventional tool bar made of tungsten carbide and tool steel. Thus, conditions of a surface subjected to machining by the tool bar of the present invention is superior to those of a surface subjected to machining by the conventional tool bar made of tungsten carbide ally and tool steel. Accordingly, when the carbon fiber composite material having superior specific stiffness and damping capacity and the metal material having high static stiffness (e.g., tungsten carbide) are properly arranged depending on mounting positions of the cutting tools, the axial stiffness as well as the natural frequency and the damping capacity of the tool bar can be simultaneously improved.

In the meantime, the cutting stability of the tool bar for use in mounting the cutting tools is proportional to dynamic stiffness which is proportional to the static stiffness and the damping capacity of the tool bar. Therefore, since the tool bar for use in mounting the cutting tools, which is manufactured to have the stiffness gradient, allows improvement of the dynamic stiffness, i.e. cutting stability, thanks to the improvement of the static stiffness and the damping capacity, even a tool bar having a large ratio of length to diameter can perform precision machining.

Moreover, since a maximum operating rotational speed of the tool bar for use in mounting the cutting tools is proportional to the natural frequency of the tool bar, a maximum operating rotational speed of the tool bar for use in mounting the cutting tools, which is manufactured to have the stiffness gradient, can also be increased. Furthermore, after the tool bar for use in mounting the cutting tools has been manufactured by arranging the general metal (steel) in the cutting tool mounting portion, drilling or tapping for forming the cutting tool mounting hole can be made directly to the cutting tool mounting portion made of the metal. In addition, it is possible to prevent damage to the composite material due to cutting forces exerted on the cutting tool.

Although the technical spirit of the high stiffness composite tool bar according to the present invention has been described above with reference to the accompanying drawings, it is intended not to limit the invention but merely to exemplify the most preferred embodiment of the invention. It will be apparent to those skilled in the art that various changes or modifications may be made thereto without departing from the spirit and scope of the invention.

What is claimed is:

1. A tool bar including an adaptor constructed to be coupled to a driving device, a body constructed to be mounted with cutting tools and a tip constructed to be supported by a workpiece, said body being constructed to be mounted with one or more cutting tools, wherein:

the adaptor and tip are made of metal material;
the body is made of composite material having high stiffness;
the composite material constructing the body is formed to surround at least a portion of the adaptor and at least a portion of the tip; and
the metal material constructing the adaptor and tip and the composite material constructing the body are securely joined to each other in an interface therebetween.

2. The tool bar as claimed in claim 1, wherein the adaptor and tip are formed with engagement protrusions, respectively, the engagement protrusion of the adaptor is inserted into the body at an end of the body and is securely joined with composite material constructing the body, and the engagement protrusion of the tip is inserted into the body at the other end of the body and is securely joined with composite material constructing the body.

3. The tool bar as claimed in claim 1, wherein the adaptor and tip are connected via a rod made of metal material, and a composite material layer is laminated on an outer surface of the rod.

4. The tool bar as claimed in claim 3, wherein the rod, the adaptor and the tip are formed as separate members, and engaged with one another in an interference-fit manner.

5. The tool bar as claimed in claim 2, wherein the adaptor is formed as two members including a body and a shank, and the shank is inserted into and securely engaged with a hole formed in the body of the adaptor.

6. The tool bar as claimed in claim 1, wherein a hardness reinforcement coating layer made of Cr or Ni based alloy is coated on the composite material constructing the body.

7. The tool bar as claimed in claim 1, wherein the body is perforated with holes for use in mounting cutting tools in a direction of intersecting a longitudinal axis of the body.

8. A tool bar mounted with cutting tools for machining a workpiece, comprising:

a metal bar occupying a portion of the length of the tool bar;
a composite bar occupying the remainder of the length of the bar; and
a connecting member which surrounds the circumference of the metal bar and composite bar and fixes the metal bar and the composite bar to each other.

9. The tool bar as claimed in claim 8, wherein the metal bar and the composite bar comprises at least two separate bars, respectively, and the metal bar and the composite bar are arranged along a longitudinal direction of the tool bar so that one metal bar is disposed at an outermost position.

10. The tool bar as claimed in claim 9, wherein the connection member comprises at least two separate members.

11. The tool bar as claimed in claim 9, wherein the connecting members are hollow rod-shaped members in which holes are formed in the longitudinal direction thereof, and the metal bar and the composite bar are inserted into and fixed to the holes.

12. The tool bar as claimed in claim 11, wherein the holes of the connection members are partitioned by walls formed in the middles thereof.

13. The tool bar as claimed in claim 12, wherein the metal bars and composite bars which have been inserted into the holes of the connecting members are fixedly bonded to each other by an adhesive.

14. The tool bar as claimed in claim 12, wherein the metal bars and the composite bars are fitted into and fixed to recesses of the connecting members in an interference-fit manner.

15. The tool bar as claimed in claim 11, wherein one end of the hollow of the connecting member positioned at an end of the tool bar is closed so that the metal bar and the composite bar are inserted into and fixed to a hole formed at the other end of the connecting member.

16. The tool bar as claimed in claim 12, wherein step portions are formed along outer circumferential portions of both end surfaces of the metal bar and composite bar, and surfaces of the walls partitioning the holes of the connecting members are formed with step protrusions to come in contact with step surfaces of the step portions.

17. The tool bar as claimed in claim 15, wherein fastening holes are formed in the middles of the lengths of the connecting members so that cutting tools are mounted therein.

18. The tool bar as claimed in claim 2, wherein a hardness reinforcement coating layer made of Cr or Ni based alloy is coated on the composite material constructing the body.

19. The tool bar as claimed in claim 3, wherein a hardness reinforcement coating layer made of Cr or Ni based alloy is coated on the composite material constructing the body.

20. The tool bar as claimed in claim 4, wherein a hardness reinforcement coating layer made of Cr or Ni based alloy is coated on the composite material constructing the body.

21. The tool bar as claimed in claim 5, wherein a hardness reinforcement coating layer made of Cr or Ni based alloy is coated on the composite material constructing the body.

22. The tool bar as claimed in claim 2, wherein the body is perforated with holes for use in mounting cutting tools in a direction of intersecting a longitudinal axis of the body.

23. The tool bar as claimed in claim 3, wherein the body is perforated with holes for use in mounting cutting tools in a direction of intersecting a longitudinal axis of the body.

24. The tool bar as claimed in claim 4, wherein the body is perforated with holes for use in mounting cutting tools in a direction of intersecting a longitudinal axis of the body.

25. The tool bar as claimed in claim 5, wherein the body is perforated with holes for use in mounting cutting tools in a direction of intersecting a longitudinal axis of the body.

26. The tool bar as claimed in claim 10, wherein the connecting members are hollow rod-shaped members in which holes are formed in the longitudinal direction thereof, and the metal bar and the composite bar are inserted into and fixed to the holes.

* * * * *